United States Patent
Bentley et al.

(10) Patent No.: US 6,317,316 B1
(45) Date of Patent: Nov. 13, 2001

(54) METHOD AND SYSTEM FOR INTEGRATED PERSONAL COMPUTER COMPONENTS

(75) Inventors: Thomas L. Bentley, Austin; Orin M. Ozias, Cedar Park, both of TX (US); David H. Titzler, Palo Alto, CA (US); Ricardo Peñate, Pacifica, CA (US); Malcolm S. Smith, Palo Alto, CA (US); Jon Sedmak, Jr., Austin, TX (US); Christopher N. Lenart, San Francisco, CA (US)

(73) Assignee: Dell USA, L.P., Round Rock, TX (US)

( * ) Notice: Subject to any disclaimer, the term of this patent is extended or adjusted under 35 U.S.C. 154(b) by 0 days.

(21) Appl. No.: 09/413,559

(22) Filed: Oct. 6, 1999

(51) Int. Cl.$^7$ .................................................. H05K 5/03
(52) U.S. Cl. ........................... 361/681; 361/724; 248/917; 345/905
(58) Field of Search ........................... 361/681, 724–727, 361/682; 248/917–925; 312/223.1, 223.6; 345/169, 905

(56) References Cited

U.S. PATENT DOCUMENTS

| | | | |
|---|---|---|---|
| 4,253,178 | 2/1981 | Kolaczia | 368/285 |
| 4,438,458 | * 3/1984 | Munscher | 312/254 |
| 4,788,658 | 11/1988 | Hanebuth | 364/900 |
| 4,964,077 | 10/1990 | Eisen et al. | 364/900 |

(List continued on next page.)

FOREIGN PATENT DOCUMENTS

WO 97/09676   3/1997   (WO) .
WO 98/18086   4/1998   (WO) ............................. G06F/17/30

OTHER PUBLICATIONS

Pending Patent application No. 09/236,862: Alan E. Beelitz, Richard D. Amberg; "Recoverable Software Installation Process and Apparatus for a Computer System"; Dell USA, L.P., filed Jan. 25, 1999.

(List continued on next page.)

Primary Examiner—Leo P. Picard
Assistant Examiner—Hung Van Duong
(74) Attorney, Agent, or Firm—Baker Botts L.L.P.

(57) ABSTRACT

A method and system integrates personal computer components to in an efficient manner that accommodates footprint and EMI demands. A base structure supports a flat panel display and enhances the stability of the display by placing the personal computer on the base structure. A support housing provides an attachment point for the display and also forms a cable cavity to enhance cable management for cables that interface external components with the personal computer. The personal computer has an inner casing with a mother board segment coupled in a hinged manner to a housing segment. The inner casing opens along the hinge to allow access to internal personal computer components, and closes during operation of the personal computer to meet EMI specifications. An outer casing encases the inner casing to enhance integration of the personal computer with other system components, such as by having a shape that conforms to the shape of a recess formed in the base structure. A CDROM drive support assembly attaches to the upper part of the inner casing and includes a support tongue that moves in cooperation with a CDROM drive door to minimize the risk of damage to the door. An interposer assembly communicates commands from the outer casing to the CDROM drive door to allow opening a closing of the door.

20 Claims, 4 Drawing Sheets

U.S. PATENT DOCUMENTS

| | | | |
|---|---|---|---|
| 5,010,551 | 4/1991 | Goldsmith et al. | 371/16.4 |
| 5,017,030 | 5/1991 | Crews | 400/485 |
| 5,196,993 | 3/1993 | Herron et al. | 361/393 |
| 5,224,024 * | 6/1993 | Tu et al. | 361/725 |
| 5,287,505 | 2/1994 | Calvert et al. | 395/600 |
| 5,348,408 | 9/1994 | Gelardi et al. | 400/715 |
| 5,355,357 | 10/1994 | Yamamori et al. | 369/75.2 |
| 5,356,099 | 10/1994 | Sereboff | 248/118.1 |
| 5,367,667 | 11/1994 | Wahlquist, et al. | 395/575 |
| 5,374,018 | 12/1994 | Daneshvar | 248/118 |
| 5,388,032 | 2/1995 | Gill et al. | 364/146 |
| 5,392,095 | 2/1995 | Siegel | 355/200 |
| 5,398,333 | 3/1995 | Schieve et al. | 395/575 |
| 5,410,447 | 4/1995 | Miyagawa et al. | 361/681 |
| 5,422,751 * | 6/1995 | Lewis et al. | 361/681 |
| 5,423,605 | 6/1995 | Liu | 312/265.6 |
| 5,443,237 | 8/1995 | Stadtmauer | 248/441.1 |
| 5,454,080 * | 9/1995 | Fasig et al. | 361/685 |
| 5,455,933 | 10/1995 | Schieve et al. | 395/183.03 |
| 5,483,437 | 1/1996 | Tang | 363/146 |
| 5,503,484 | 4/1996 | Louis | 400/489 |
| 5,513,319 | 4/1996 | Finch et al. | 395/185.08 |
| 5,522,572 | 6/1996 | Copeland et al. | 248/118 |
| 5,526,180 | 6/1996 | Rausnitz | 359/609 |
| 5,530,847 | 6/1996 | Schieve et al. | 395/183.14 |
| 5,537,585 | 7/1996 | Blickenstaff et al. | 395/600 |
| 5,537,618 | 7/1996 | Boulton et al. | 395/161 |
| 5,547,154 | 8/1996 | Kirchoff et al. | 248/118.3 |
| 5,592,362 | 1/1997 | Ohgami et al. | 361/686 |
| 5,596,481 | 1/1997 | Liu et al. | 361/683 |
| 5,596,482 | 1/1997 | Horikoshi | 361/683 |
| 5,668,992 | 9/1997 | Hammer et al. | 395/651 |
| 5,678,002 | 10/1997 | Fawcett et al. | 395/183.01 |
| 5,680,640 | 10/1997 | Ofek et al. | 395/839 |
| 5,689,706 | 11/1997 | Rao et al. | 395/617 |
| 5,694,293 * | 12/1997 | Seto et al. | 361/687 |
| 5,724,224 | 3/1998 | Howell et al. | 361/680 |
| 5,732,268 | 3/1998 | Bizzarri | 395/652 |
| 5,748,877 | 5/1998 | Dollahite et al. | 395/183.12 |
| 5,768,370 | 6/1998 | Maatta et al. | 379/433 |
| 5,775,822 | 7/1998 | Cheng | 400/489 |
| 5,790,796 | 8/1998 | Sadowsky | 395/200.51 |
| 5,796,579 | 8/1998 | Nakajima et al. | 361/683 |
| 5,797,281 | 8/1998 | Fox | 63/12 |
| 5,803,416 | 9/1998 | Hanson et al. | 248/118 |
| 5,805,882 | 9/1998 | Cooper et al. | 395/652 |
| 5,809,248 | 9/1998 | Vidovic | 395/200.49 |
| 5,809,511 | 9/1998 | Peake | 707/204 |
| 5,818,635 | 10/1998 | Hohn et al. | 359/612 |
| 5,819,274 | 10/1998 | Jackson, Jr. | 707/10 |
| 5,825,355 | 10/1998 | Palmer et al. | 345/336 |
| 5,826,839 | 10/1998 | Chen | 248/118 |
| 5,832,522 | 11/1998 | Blickenstaff et al. | 707/204 |
| 5,835,344 | 11/1998 | Alexander | 361/683 |
| 5,854,828 | 12/1998 | Kocis et al. | 379/93.31 |
| 5,860,001 | 1/1999 | Cromer et al. | 395/651 |
| 5,860,002 | 1/1999 | Huang | 395/652 |
| 5,860,012 | 1/1999 | Luu | 395/712 |
| 5,861,884 | 1/1999 | Fujioka | 345/338 |
| 5,881,236 | 3/1999 | Dickey | 395/200.51 |
| 5,884,073 | 3/1999 | Dent | 395/652 |
| 5,904,327 | 5/1999 | Cheng | 248/118.1 |
| 5,905,632 | 5/1999 | Seto et al. | 361/683 |
| 5,906,506 | 5/1999 | Chang et al. | 439/500 |
| 5,909,544 | 6/1999 | Anderson, II et al. | 395/200.38 |
| 5,939,694 * | 8/1999 | Holcomb et al. | 235/381 |
| 5,953,533 | 9/1999 | Fink et al. | 395/712 |
| 5,960,204 | 9/1999 | Yinger et al. | 395/712 |
| 5,963,743 | 10/1999 | Amberg et al. | 395/712 |
| 5,991,543 | 11/1999 | Amberg et al. | 395/712 |
| 5,995,757 | 11/1999 | Amberg et al. | 395/712 |
| 6,034,869 | 3/2000 | Lin | 361/686 |
| 6,038,597 | 3/2000 | Van Wyngarden | 709/219 |
| 6,049,454 | 4/2000 | Howell et al. | 361/686 |
| 6,050,833 | 4/2000 | Danzyger et al. | 439/92 |
| 6,113,050 * | 9/2000 | Rush | 248/349 |
| 6,167,383 | 12/2000 | Henson | 705/26 |

OTHER PUBLICATIONS

Pending Patent application No. 09/245,148: Jeffrey N. Sloan, Tim Sullivan, David S. Springer, "*Method and Apparatus for Diagnosing and Conveying an Identification Code in Post on a Non–Booting Personal Computer*", Dell USA, L.P., filed Feb. 4, 1999.

Compaq Computer Corporation, Press Release, "New PCs Offer Equipment, Colour and Personality; Compaq's Presario Range Opened Up for Customisation" at internet >http://biz.yahoo.com/prnews/000719/compaq_new.html< printed Jul. 24, 2000.

Compaq Computer Corporation, "Home and Home Office Computing, My Style"at internet >wysiwyg://3/http://athome.compaq.com/showroom/static/splash.asp< printed Jul. 18, 2000.

Epson, "Epson Stylus Color 74i It makes a Colorful Case for Being Your iMac Printer" at Internet >http://www.epson-.com/printer/inkjet/sty740ihtml<, printed Jul. 24, 2000.

Radio Shack, advertisement, p. 2, Aug. 20, 2000.

@Backup Company, "@Backup Company Information Page" at Internet, http://security.atbackup.com/VID101.3.819255.0/Company.htm, Printed Jun. 15, 1999.

@Backup Company, "@Backup Company Frequently Asked Questions" at Internet, http://security.atbackup.com/VID101.3.819255.0/FAQ.asp, Printed Jun. 15, 1999.

@Backup Company, "Frequently Asked Questions: Technical" at Internet, http://security.atbackup.com/VID101.3.819255.0/Tech.asp, Printed Jun. 15, 1999.

@Backup Company, "Are You Protected" at Internet, http://security.atbackup.com/VID101.3.819255.0/Main.asp, Printed Jun. 15, 1999.

CNET.com, "IBM to Get Colorful with New Notebooks" at Internet >http://news.cnet.com/new/0–1003–200–296049.html?tag=st.cn.1fd2.<, printed Oct. 6, 1999.

3Com, "Palm Computer, News and Promotions" at Internet >http://www.palm.com/pr/holidaydebut.html<, printed Oct. 5, 1999.

Exploring Windows NT "ZD Journals" at Internet >http://www.zdjournals.com/9802.ewn9821.html<, printed Oct. 18, 1999.

PCWorld News "Compaq Debuts Home PCs" at Internet >http://www2.pcworld.com.html<, printed Oct. 18, 1999.

"HP builds in Net button," at Internet >http://news.cnet.com/news/0–1003–202–316545.html<, printed Oct. 18, 1999.

"Packard Bell PCs provide state–of–the–art technology and complete user support" at >http://www.gadgetguru.com.html<, printed Oct. 18, 1999.

* cited by examiner

METHOD AND SYSTEM FOR INTEGRATED PERSONAL COMPUTER COMPONENTS

TECHNICAL FIELD

This disclosure relates in general to the field of computers, and more particularly to a method and system for integrating personal computer components.

BACKGROUND

Ever since and even before the origination of Moore's Law, the personal computer industry has struggled to put an increased amount of computing power into a personal computer with a decreased footprint. Personal computers with smaller footprints leave greater space on desktops for the personal computer's user. However, as a personal computer's size decreases, the size of components included in the personal computer tend to decrease, leading to decreased functionality and robustness.

For instance, laptop computers are designed with portability as the central objective. However, top-of-the-line laptop computers generally have slower processors, less random access memory and smaller hard drives than do top-of-the-line personal computers. In addition, laptop computer components generally have less strength and are thus more prone to break. One example of reduced robustness is the CDROM drives typically found on laptops. Laptop CDROM drives are generally manufactured with less robust parts, such as doors, than conventional CDROM parts in order to reduce the overall size of the CDROM drive. When pressure is placed on the door, as often happens when a CDROM is placed in or removed from the door, the door may snap off or is otherwise rendered non-functional, generally requiring replacement of the CDROM drive.

Another factor that effects the footprint size of a personal computer is the option of upgrading the personal computer at a future date with additional internal components. For instance, personal computers constructed as a "tower" are too large to reside on a desktop, but generally have a relatively large amount of internal space for components, including aftermarket components, for expanding the personal computer's functionality. By comparison, "desktop" personal computers have reduced footprint to allow a user to rest the personal computer on a desktop, but have relatively less room for aftermarket expansion. In contrast, laptop computers have minimal footprints for ease of use in any location, but are designed for minimal user interaction with internal components.

In addition to increased footprint, a number of other significant tradeoffs occur as a personal computer's footprint changes in size. For instance, as footprint size decreases, electromagnetic interference (EMI) generated by the personal computer becomes more difficult to control to desired specifications. Thus, a personal computer with a generally large footprint allows a greater degree of flexibility in the design of its shape and appearance. In contrast, personal computer's designed with generally smaller footprints tend to have a more utilitarian appearance, in part to comply with EMI requirements. One example of a utilitarian design is the design typically employed on laptop personal computers. The internal components of laptops are tightly packed in a restricted space with EMI a major consideration in the arrangement of internal components. The result is a utilitarian box with little flexibility for modification of internal components or appearance.

As another example of a tradeoff that arises with changes in a personal computer's size, cable connections tend to become more complicated as footprint increases. For instance, personal computers with large footprints generally have a greater distance between essential external components, such as the monitor, keyboard, mouse and printer, than do personal computers with smaller footprints. Longer cables are more difficult to manage and also increase EMI output from the personal computer system.

One recent and significant advance towards reducing the footprint of personal computer systems is the introduction of commercially-available flat panel displays (FPDs). FPDs are considerably smaller than conventional cathode ray tube (CRT) displays, but also less robust and more susceptible to damage. For instance, FPDs tend to be so light in weight that they can easily be tipped over or otherwise disturbed, resulting in damage to the FPD. Thus, in order to minimize the risk of damage to the FPD, a large support is typically used, effectively eliminating the advantage presented by an FPD's reduced footprint.

SUMMARY

Therefore, a need has arisen for a method and system which integrates the components of a personal computer to support increased computing resources in a reduced footprint.

A further need exists for a method and system which integrates a FPD as a personal computer system component to take advantage of the reduced footprint of the FPD while also supporting the FPD in a robust manner.

A further need exists for a method and system which effectively manages EMI without substantially reducing the options for appearance designs of the personal computer for a given personal computer footprint.

A further need exists for a method and system which effectively manages cables that interface the personal computer system's various components.

A further need exists for a method and system which improves the robustness of CDROM components associated with a personal computer.

In accordance with the present disclosure, a method and system is provided that substantially eliminates or reduces disadvantages and problems associated with previously developed personal computer systems. The method and system integrate personal computer system components in a compact and efficient manner to reduce the personal computer system's footprint while enhancing the efficiency of the usage of available space for personal computer components.

In one embodiment, the method and system for integrating personal computer components enhances the support of a FPD associated with a personal computer by using the weight of the personal computer to stabilize a base structure associated with the FPD. The base structure rests in contact with a desktop or other suitable surface. A support adapted to couple to the FPD extends upward from the base structure. A recess formed in the base structure substantially conforms to the shape of the bottom of the personal computer so that the personal computer rests securely within the recess when placed on top of the support. In one alternative embodiment, the FPD support is formed as a housing that provides a cavity aligned with the cables of the personal computer. The cavity provides a convenient arrangement for managing cables communicating between the personal computer and the FPD or other external components.

In another embodiment, the shape of the exterior casing of the personal computer is more effectively managed without significant impact on EMI by using inner and outer casings for the personal computer. The outer casing provides a shape that conforms to the base structure or that is otherwise aesthetically pleasing. The inner casing provides for manufacture of a personal computer to desired size and EMI specifications.

The inner casing has a motherboard segment coupled by a hinge to a housing segment. The mother board segment swings open and shut, acting as a door relative to the housing segment. The mother board of the personal computer is coupled to the inside of the mother board segment so that the mother board is easily accessible when the mother board segment is swung open. The housing segment provides a cavity of adequate volume to accept and store inside it such conventional personal computer components as the power supply, hard drive and cooling equipment. When hinged together, the mother board and housing segments provide for EMI within desired specifications. When hinged open, computer system upgrades and maintenance are available. In one embodiment, the hinge and cable connections between the mother board and housing segments are removable to allow separation of the mother board for maintenance or replacement. For instance, a pin and sleeve arrangement allow separation of the motherboard and housing segments by simply sliding the motherboard segment laterally relative to the housing segment when the motherboard segment is in an open position.

In another embodiment, a CDROM drive is located on top of the housing segment so that, when the personal computer is placed in the base structure, the CDROM door is easily accessible to a user. To reinforce the CDROM door a CDROM drive support assembly secures the CDROM to the top portion of the personal computer. A support tongue has a tongue slot that slidingly engages a guide groove of the support housing. The support tongue couples to the door of a CDROM drive which is in turn coupled to the support housing so that the support tongue slides in and out of the support housing as the CDROM door slides in and out of the CDROM drive. An interposer piece communicates user inputs to existing CDROM hardware, including user activation of the CDROM door button and emergency release button. A cover piece cooperates with the support tongue and interposer piece to provide improved appearance and to ensure that the CDROM closes flush with the outer casing. Although described in an application associated with a CDROM, in alternative embodiments, the support tongue may be adapted to enhance other devices that project outwards from a personal computer, including other devices that accept a CD.

The method and system for integrating personal computer components provides a number of important technical advantages. One important technical advantage is the integration of the components of a personal computer to support increased computing resources in a reduced footprint. The space available for various components has decreased dependence on EMI requirements due to the modular construction of the personal computer system when viewed as a complete system.

Another important technical advantage is the integration of a FPD as a personal computer system component in a robust manner that also takes advantage of the reduced footprint of the FPD. The personal computer system essentially acts to stabilize the FPD when the personal computer system is placed on the base structure that couples to the FPD. Although the personal computer may enhance the stability of the FPD when the personal computer rests on the base structure, the base structure may also support the FPD in the absence of the personal computer. Thus, a user is provided with increased flexibility when arranging personal computer system components around the desktop.

Another important technical advantage is the effective management of EMI without substantially reducing the options for the personal computer's integration with other components, the personal computer's appearance for a given footprint, or other design implications. Further, a standardized inner casing arrangement ensures compliance with EMI and other requirements while allowing greater flexibility in the production of a variety of computer shapes and sizes through variations in the outer casing. Thus, the modular inner and outer casing arrangement enhances efficiency in the manufacture of personal computer systems by allowing greater flexibility for a build-to-order manufacturing approach.

Another important technical advantage is the enhanced management of cables that interface the personal computer system's various components. For instance, the cavity formed in the support allows the routing of cables from the personal computer to various components in an organized manner. Further, cables are substantially hidden from sight and generally removed from the danger of inadvertent damage such as sometimes occurs when a user trips over a cable.

Another important technical advantage is provided by locating the CDROM on the top of the personal computer system. For instance, a CDROM drive located at the upper portion of the personal computer has a reduced likelihood of having the operation of the CDROM door interfered with by items located near the personal computer. The support tongue reinforces the strength of the CDROM door to reduce the risk of damage to the door during operation or when the door is in an open position. Further, use of the support tongue allows for the use of more compact and less robust CDROM drives. For instance, the support tongue allows CDROM drives designed for laptop systems to be used in desktop personal computers.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
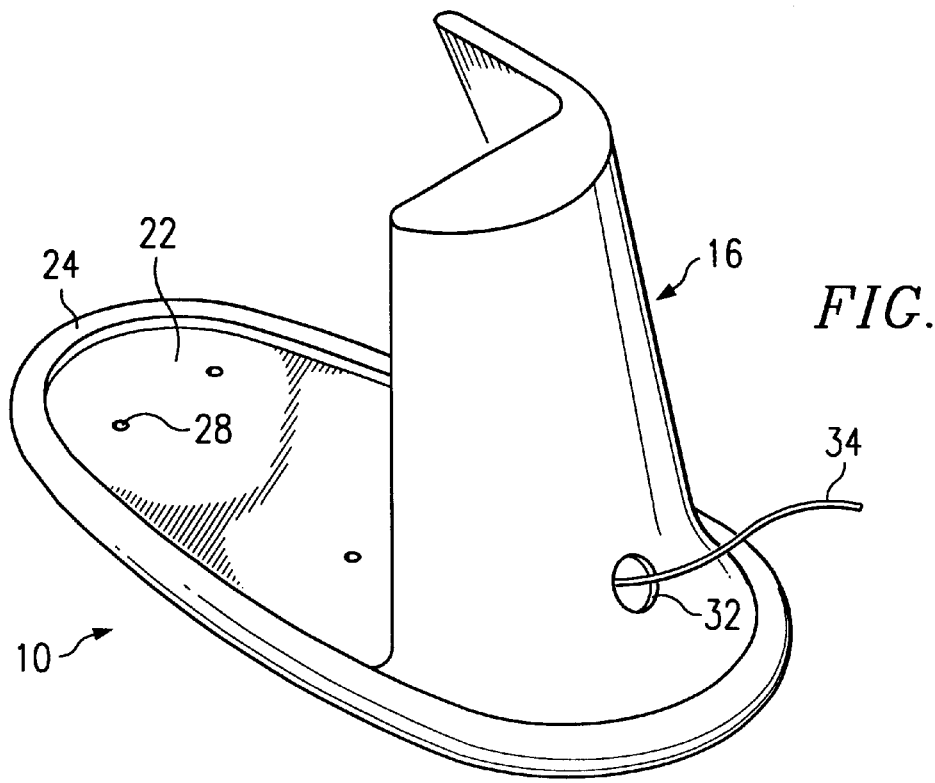
FIG. 1 depicts a top perspective view of a base structure.
Figure 2:
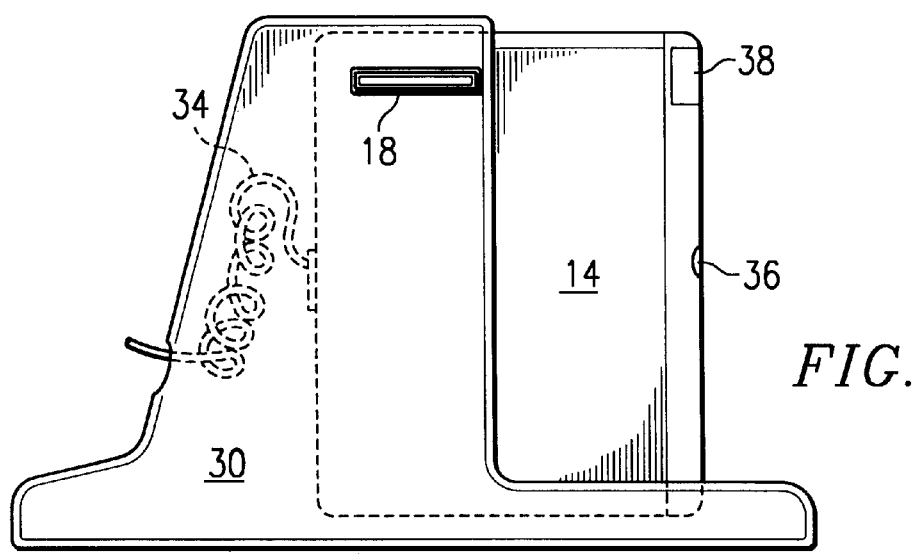
FIG. 2 depicts a front side view of a base structure.
Figure 3:
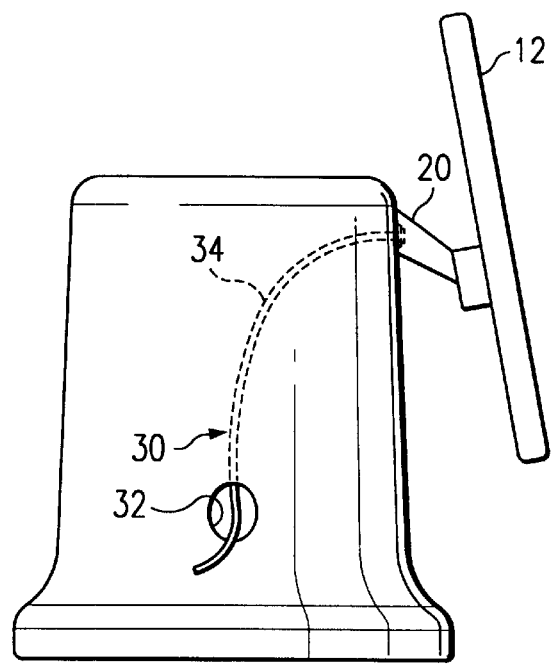
FIG. 3 depicts a side cutaway view of a base structure and associated cable cavity.
Figure 4:
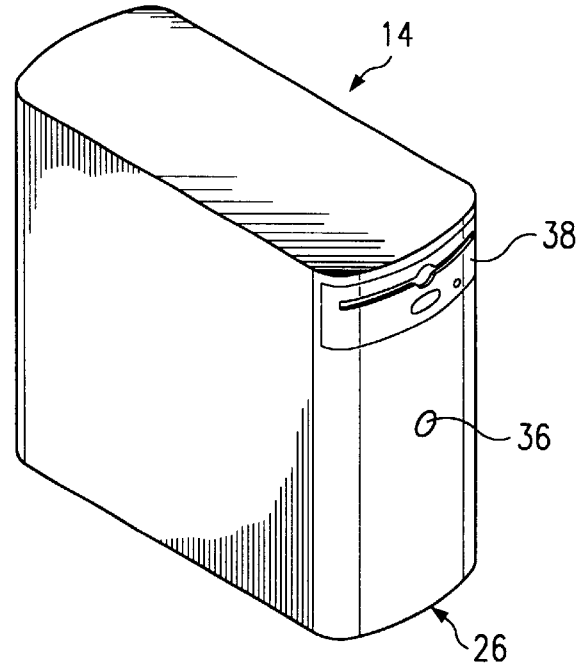
FIG. 4 depicts a personal computer adapted to rest in the base structure.

Preferred embodiments and their advantages are best understood by reference to FIGS. 1 through 7, wherein like numbers are used to indicate like and corresponding parts of the disclosed embodiments.

A personal computer system is comprised of a large variety of components that are assembled and operated in a generally standardized format. A personal computer system generally includes a personal computer having a housing that holds internal components, such as the processor and storage, and that interacts with external components, such as a monitor, keyboard and mouse. One primary advantage of personal computer systems is that consumers have a virtually unlimited selection of components to include in a system when purchasing the system. Thus, consumers may specify a desired configuration of components and a computer system may then be built to order for the consumer.

Although consumers may have personal computer systems built to order, a given set of components may be assembled in a variety of different manners so that personal computer systems having identical components also may have significantly different appearances and functionality. The key to winning the loyalty of personal computer system users is to consistently provide fully functional personal computer systems that are easy and convenient to use. Thus, the integration of personal computer components into a complete personal computer system is more than a matter of fitting parts together.

Referring now to FIGS. 1 through 4, a personal computer system is depicted having an enhanced integration of personal computer components. A base structure 10 efficiently integrates a FPD 12 and personal computer 14 into a compact, easy-to-use personal computer system. Base structure 10 rest in secure engagement with a surface, such as a desktop. A support housing 16 extends upward from base structure 10 to provide a FPD coupling attachment point 18 having a height above that desktop surface that allows convenient viewing of the FPD by a user. A pivot arm 20 rotationally engages support housing 16 at attachment point 18 and also rotationally engages FPD 12. Pivot arm 20 allows a user to perform lateral and longitudinal adjustments of the position of FPD 12 to provide optimal view of FPD 12 by the user.

Base structure 10 has a recess 22 defined by a raised lip 24 formed proximate the outer circumference of base structure 10. Recess 22 forms a shape substantially conforming to the shape of bottom portion 26 of personal computer 14. Thus, personal computer 14 fits securely within recess 22 when personal computer 14 is placed on top of base structure 10. Personal computer 14 is further prevented from movement within recess 22 by peg holes 28 that accept support pegs located on the bottom surface of personal computer 14. When personal computer 14 is assembled on base structure 10, the weight of personal computer 14 enhances the stabilization of the computer system as whole, thus reducing the risk that damage may occur to FPD 12. Additionally, the footprint of the computer system is not significantly increased and personal computer 14 is not directly attached to FPD 12. Thus, base structure 10 enhances stability without substantially effecting system footprint and allowing user flexibility of the arrangement of personal computer 14 relative to FPD 12.

In addition to providing an appropriate attachment point for FPD 12, support housing 16 also provides for enhanced cable management. A cable cavity 30 is formed within support housing 16 so that cables 34 interacting with personal computer 14 may be conveniently arranged and routed out a single cable opening 32. Further, a cable 34 extending from FPD 12 to personal computer 14 is secured without interfering with system operation and while removed from sight.

Support housing 16 includes an extended front portion that provides for FPD attachment at attachment point 18, but that also provides a uniform frontal appearance for the personal computer system. In contrast, the rear portion of support housing 16 does not have to extend around a personal computer located within recess 22, allowing ease of access by a user to the rear portion of personal computer 14. Personal computer components commonly used by a user, such as the power switch 36 and CDROM 38 remain accessible at one side of the system. Thus, support housing 16 performs several important functions, including the support of a FPD 12, the management of cables 34 and the presentation of a uniform system appearance without interfering with system operation. In addition, support housing 16 acts as a central point of contact for the personal computer and monitor so that the use of a single Kennsington lock associated with the personal computer, monitor and support housing will help to secure the personal computer system from theft.

Figure 5:
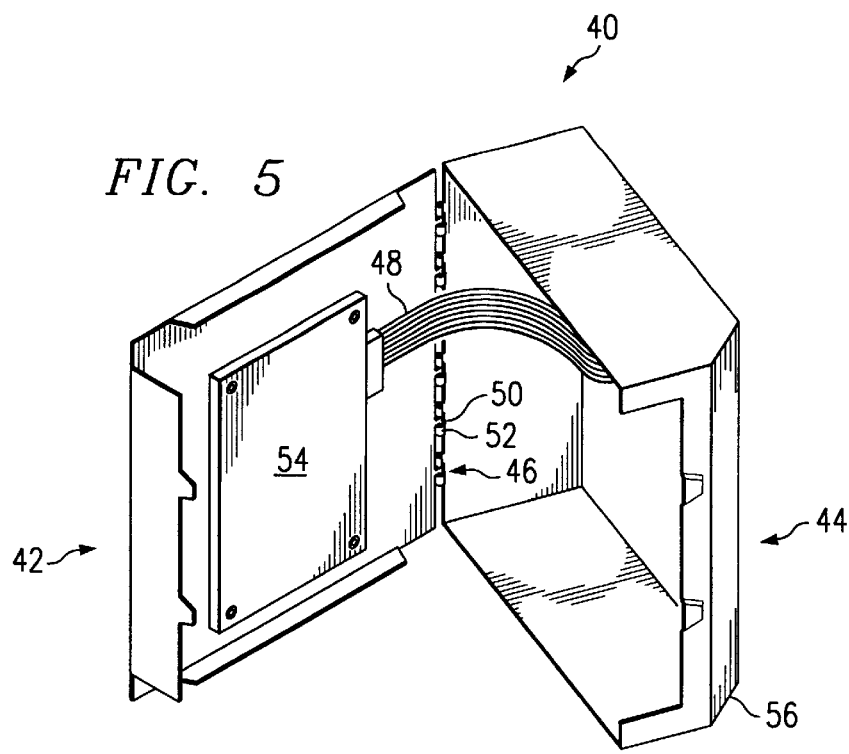
FIG. 5 depicts a rear perspective view of an inner casing.
Figure 6:
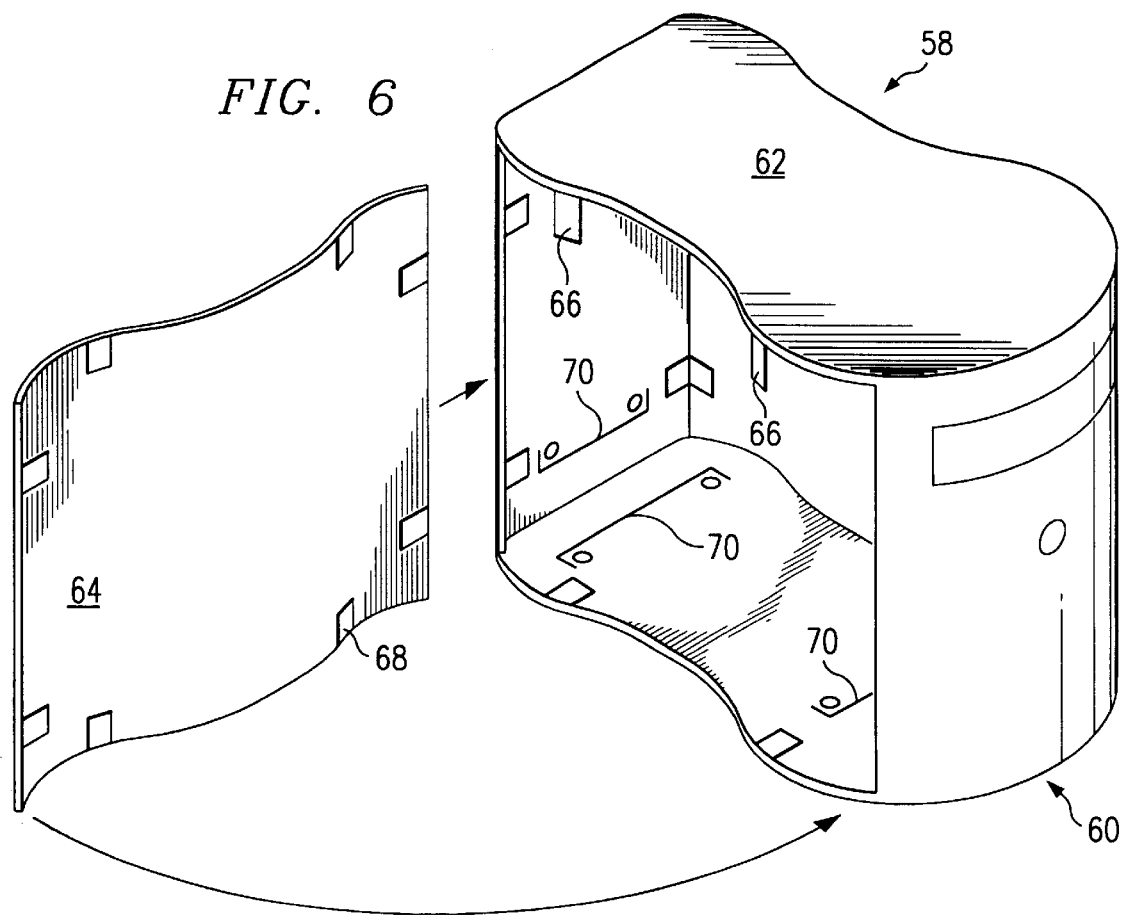
FIG. 6 depicts a front perspective of an outer casing.

Referring now to FIGS. 5 and 6, a personal computer structure is depicted that aids the integration of a personal computer with a base structure, such as when the personal computer is built to order for a customer. FIG. 5 depicts an inner casing that integrates internal components of the personal computer in a compact but accessible manner that meets EMI specifications. FIG. 6 depicts an outer casing having an increased degree of flexibility for appearance and for integration of personal computer 14 with base structure 10 and with other external components of a personal computer system.

An inner casing 40 has a mother board segment 42 coupled to a housing segment 44 by a hinge 46. Cables 48 interface personal computer components associated with mother board segment 42 and housing segment 44. Hinge 46 has a pin and sleeve construction that allows mother board segment 42 to swing open and shut like a door relative to housing segment 44, but also allows ease of separation of the two segments from each other. A series of pins 50 associated with one segment slide into engagement with a series of sleeves 52 associated with the opposing segment so that when mother board segment 42 is in an open position relative to housing segment 44, the two segments may be easily separated from each other by sliding one segment relative to the other and by disconnecting cables 48.

Mother board segment 42 is adapted to accept a mother board 54 coupled to its interior surface. When maintenance or upgrade of a mother board or its components is desired, mother board segment 42 is simply opened to expose mother board 54. As one example of the improved maintenance provided by this arrangement, if a component on mother board 54 fails, a user may simply remove mother board segment 42 and replace it with a mother board segment having an operational mother board 54. Similarly, housing segment 44 is adapted to accept internal personal computer components. Replacement or maintenance of a failed component is easily accomplished by opening inner casing 40 to expose the components loaded in housing segment 44.

One important consideration in the size and material selection of inner casing 40 is that EMI specifications be met. However, since inner casing 40 is not exposed to view of a user in an assembled personal computer system, inner casing 40 may have a utilitarian shape formed from a desired material without concern for appearance. For example, a beveled or chamfered edge 56 to aid in the integration of inner casing 40 with an appropriate outer casing.

FIG. 6 depicts an outer casing 58 having an upper section 62 secured to a main section 60 as depicted by arrows 66, and an expanded view of a side section 64. Outer casing 58 is simply constructed around inner casing 40 and held together by snap attachments 68 or other conventional coupling devices. Inner casing attachment points 70 located along the interior surface of outer casing 58 couple inner casing 40 and outer casing 58 to minimize any movement of inner casing 40 once outer casing 58 is assembled. The external shape of outer casing 58 provides for ease of integration with base structure 10 and flexibility in the design of the appearance of personal computer 14. In the depicted embodiment, outer casing 58 has three sections that snap together. In alternative embodiments, a variety of sections may be used.

Figure 7:
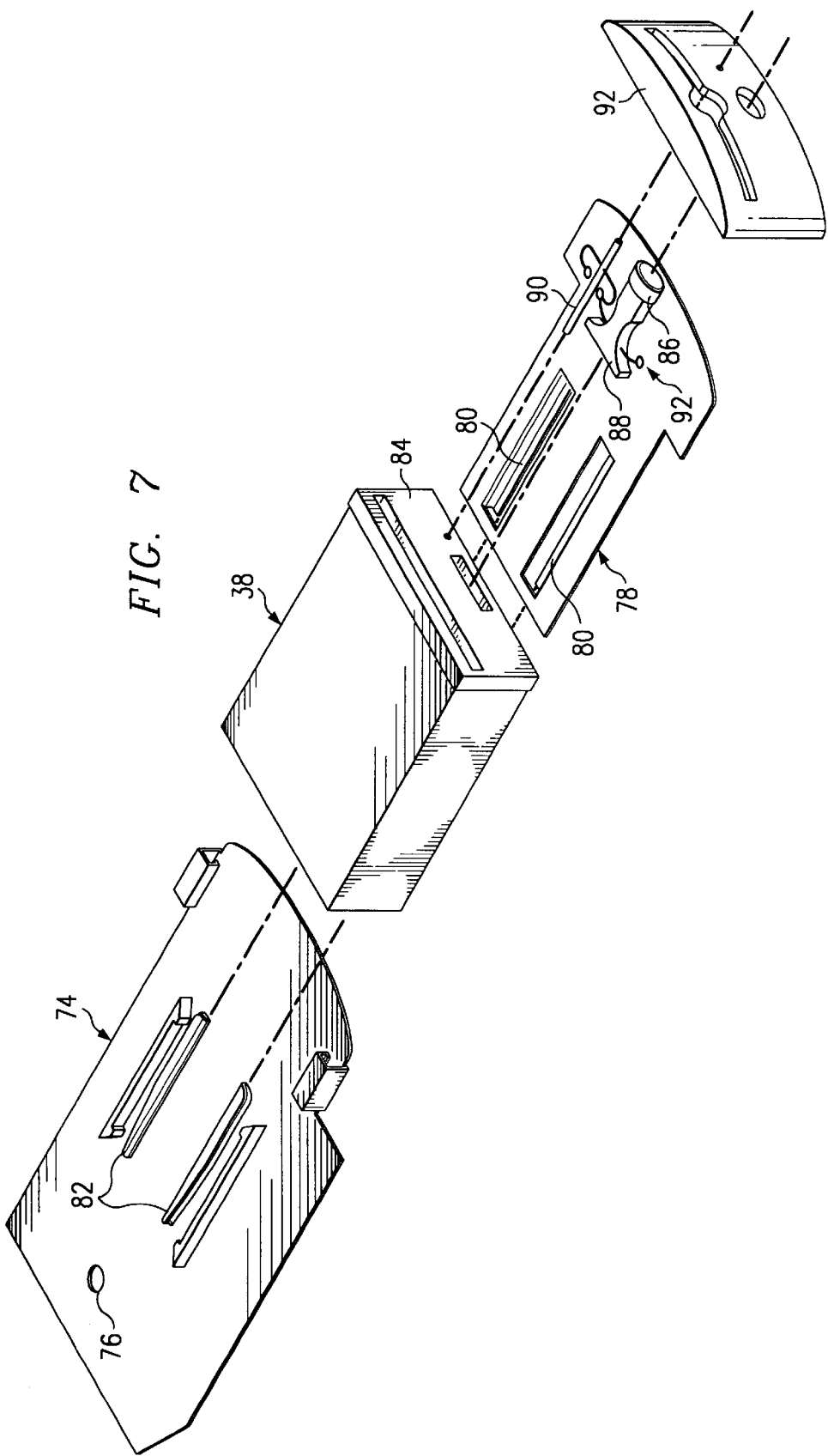
FIG. 7 depicts an expanded view of a CDROM drive support assembly.

Referring now to FIG. 7, a top perspective expanded view of a CDROM support assembly 72 is depicted. A support housing 74 attaches to the upper surface of inner casing 40, such as with a single attachment point 76. A support tongue 78 has a tongue slot 80 that slides into a guide groove 82 of support housing 74 to slidingly engage support tongue 78 to support housing 74. CDROM drive 38 is secured to support housing 74 on top of support tongue 78 and CDROM door 84 is coupled to support tongue 78. If CDROM door 84 extends outward from CDROM drive 38, then support tongue 78 travels in cooperation with door 84. Thus, support tongue 78 provides extra support to door 84 to reduce the stress placed on door 84 when CDs are placed into or removed from CDROM drive 38.

An interposer assembly 86 is located on the outer periphery of support tongue 78 to communicate user commands to CDROM drive 38. For instance, a main button 88 presses against the CDROM drive 38 so that when a user presses main button 88 the force of the input is translated to CDROM drive 38 to activate door 84. An emergency eject pin 90 communicates with the emergency eject input associated with CDROM drive 38 to allow activation of emergency release of door 84 when it becomes stuck. A spring assembly 92 coupled to support tongue 78, button 88 and pin 90 provides an outward bias to button 88 and emergency eject pin 90. A cover 92 couples over interposer assembly 86 to retain assembly 86 in place and to provide an appropriate appearance.

In operation, support assembly 72 is secured to inner casing 40 and then encased within outer casing 58. Cover 92 resides flush with outer casing 58 when door 84 is in a closed position. A user activates the door to an open position by pressing button 88, causing door 84 to extend outward in a conventional manner. Support tongue 78 and cover 92 extend outward in cooperation with door 84 so that support tongue 78 provides extra strength to door 84. Tongue slot 80 and guide groove 82 cooperate to increase the degree of alignment of cover 92 as it approaches a closed position substantially flush with outer casing 58, but decrease the degree of alignment in the open position to allow flexibility of door 84. In one embodiment, the light typically found on CDROM drive 38 to indicate activity of drive 38 is instead interfaced with the IDE bus so that bus activity that generally indicates hard drive usage will also indicate use of drive 38.

All of the present invention has been described in detail and it should be understood that various changes, substitutions and alternations can be made hereto without the parting from the spirit and scope of the invention as defined by the appended claims.

What is claimed is:

1. A system for supporting a flat panel display associated with a personal computer, the system comprising:
   a base structure having a recess having a shape, the base structure further having a support extending upwards, the support adapted to couple with the flat panel display; and
   a personal computer having a base with a shape that substantially conforms with the shape of the base structure recess, the personal computer resting in the recess to enhance the stability of the base structure.

2. The system of claim 1 wherein the personal computer comprises an inner casing and an outer casing.

3. The system of claim 2 wherein the inner casing comprises:
   a mother board segment adapted to accept a mother board component of the personal computer; and
   a housing segment coupled in a hinged manner to the mother board segment, the housing segment adapted to accept personal computer components.

4. The system of claim 2 wherein the outer casing forms a shape that conforms with the shape of the recess of the base structure.

5. The system of claim 2 further comprising a CDROM drive support assembly coupled to the upper portion of the inner casing.

6. The system of claim 5 wherein the CDROM drive support assembly comprises:
   a support housing coupled to the inner casing;
   a support tongue slidingly engaged with the support housing; and
   a CDROM drive coupled to the support housing, the CDROM drive having a door for accepting a CD, the door coupled to the support tongue.

7. The system of claim 6 further comprising an interposer assembly coupled to the support tongue and in communication with the CDROM dive to translate user inputs from the outer casing to the CDROM drive.

8. The system of claim 7 wherein the interposer assembly comprises:
   a button for translating an open command to the CDROM drive; and
   an emergency eject pin for translating an emergency eject command to the CDROM drive.

9. A personal computer comprising:
   an inner casing having a mother board segment and housing segment, the mother board and housing segments coupled together by a hinge; and
   an outer casing having plural sections that interconnect to encase the inner casing, the outer casing providing an enhanced appearance for the personal computer.

10. The personal computer of claim 9 wherein the outer casing further provides a shape for integrating the personal computer with a base structure.

11. The personal computer of claim 9 wherein the inner casing comprises at least one chamfered edge.

12. The computer system of claim 9 wherein the inner casing and outer casing are coupled with pin and slot hinge assembly that enhances ease of separation of the mother board segment from the housing segment.

13. A method for supporting a flat panel display associated with a personal computer, the method comprising:
   coupling the flat panel display to a support extending from a base structure, the base structure having an upper surface; and
   enhancing the stability of the base structure by placing the personal computer on the upper surface of the base structure.

14. The method of claim 13 wherein the enhancing step further comprises placing the personal computer in a recess formed in the base structure, the personal computer having a shape that substantially conforms to the shape of the recess.

15. The method of claim 13 further comprising:

managing cables associated with the personal computer by routing the cables through the base structure.

16. A method for enhancing the strength of a CDROM door comprising:

coupling a support tongue to the CDROM door; and engaging the support tongue with the personal computer casing in a sliding manner, the support tongue moving freely with the CDROM door.

17. The method of claim 16 wherein the engaging step further comprises:

coupling a housing support to the personal computer casing, the housing support having a guide groove; and engaging the guide groove with a slot associated with the support tongue.

18. The method of claim 16 further comprising:

coupling an interposer assembly to the support tongue; and communicating commands to the CDROM door through the interposer assembly.

19. The method of claim 18 wherein the interposer assembly comprises an emergency eject pin, the method comprising:

communicating an emergency eject command to the CDROM door through the emergency eject pin of the interposer assembly.

20. A method for supporting a flat panel display associated with a personal computer, the method comprising:

coupling the flat panel display to a base structure;

enhancing the stability of the base structure by placing the personal computer on top of the base structure; and managing cables associated with the personal computer by routing the cables through the base structure.

* * * * *